No. 690,545. Patented Jan. 7, 1902.
C. C. WORTHINGTON.
STEAM PUMPING ENGINE.
(Application filed Nov. 22, 1898.)
(No Model.)
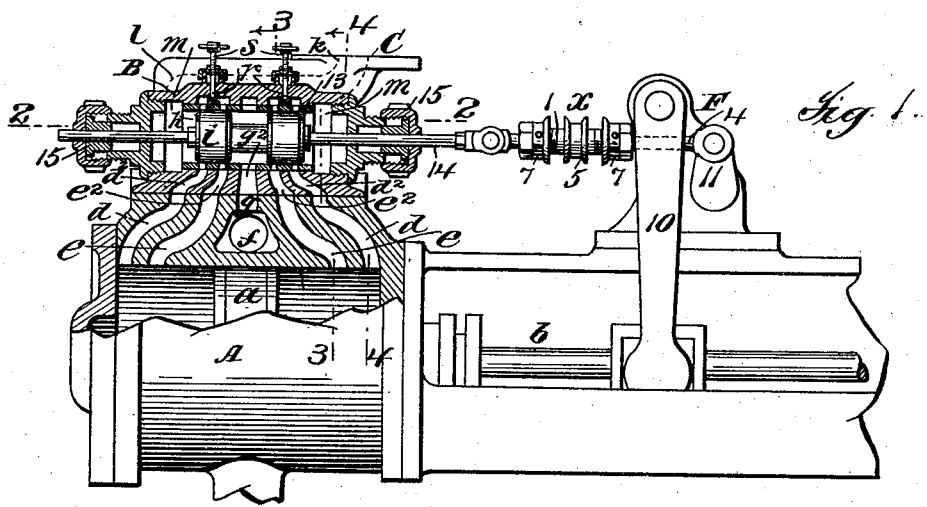
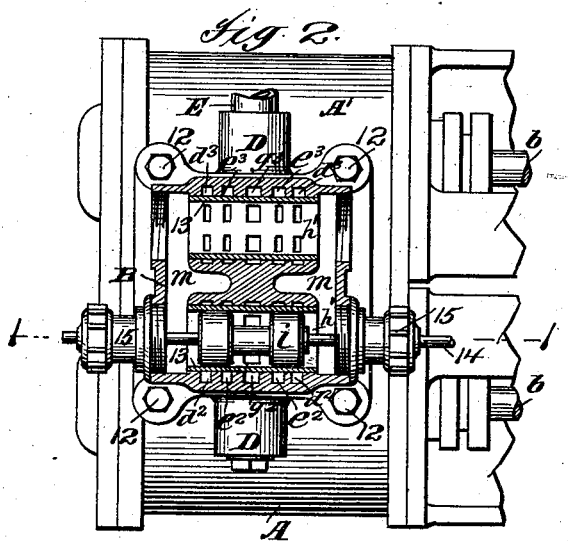
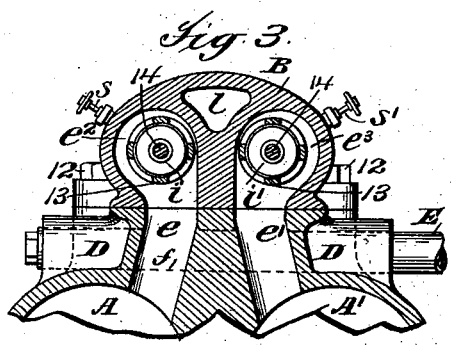
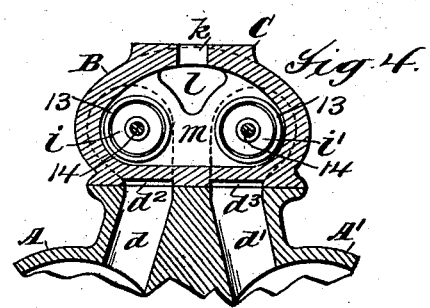
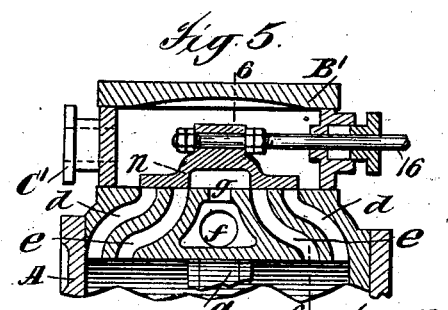
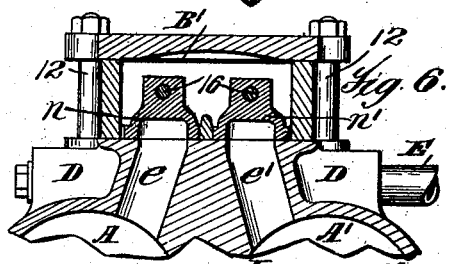
Attest:
T. F. Kehoe.
A. W. Bourke.
Inventor
Charles C. Worthington
By Philipp Phelps Lawyer
Attys
THE NORRIS PETERS CO., PHOTO-LITHO., WASHINGTON, D. C.

UNITED STATES PATENT OFFICE.

CHARLES C. WORTHINGTON, OF IRVINGTON, NEW YORK.

STEAM PUMPING-ENGINE.

SPECIFICATION forming part of Letters Patent No. 690,545, dated January 7, 1902.

Application filed November 22, 1898. Serial No. 697,147. (No model.)

*To all whom it may concern:*

Be it known that I, CHARLES C. WORTHINGTON, a citizen of the United States, residing at Irvington, county of Westchester, and State of New York, have invented certain new and useful Improvements in Steam Pumping-Engines, fully described and represented in the following specification and the accompanying drawings, forming a part of the same.

The object of the present invention is to provide means whereby either an ordinary slide-valve or a piston-valve may be used interchangeably with the same steam cylinder or cylinders and the substitution of one for the other be made readily and without an expensive reconstruction of the engine.

The invention is applicable to single or duplex steam-cylinders; but it is of especial value in connection with small duplex steam-pumps and similar small steam-engines in which the small steam-cylinders are placed close together and may be cast integral and a single valve-chest used for both cylinders, one object of the invention being to provide a simple, compact, and efficient construction of piston-valve steam-chest for such engines.

Steam-engines, and especially small steam-pumps and other small steam-engines, are frequently used under conditions where it is important that the engine shall be provided with a piston-valve, and under other conditions of use it is very desirable that an ordinary D or other slide-valve shall be used. Thus under high steam-pressures the balance on the piston-valve and resulting freedom from wear is an important advantage of the piston-valve construction, especially where lubrication cannot well be secured—as, for instance, when the steam is used for feed-water or other purposes for which the presence of oil in the system is objectionable. On the other hand, when the steam-pressure used is low, so that the wear of the slide-valve is slight, or under high pressures where lubrication is not objectionable, the simplicity of the slide-valve makes its use desirable, and such use is especially important where it is inconvenient to provide for frequent or skilled attention to the valve. The valve construction of an engine, therefore, should depend upon the service required of the engine and the conditions of use as to the condensing of the exhaust-steam and the accessibility of the engine and the attention that can be given the valves. In the case of large engines that are built to order and in which the service or conditions of use are not liable to change the engine will of course be built with slide-valve or piston-valve, as required, and change will rarely be necessary. Smaller engines must be kept in stock by the manufacturer, however, and orders for such engines filled without delay, and the service or conditions of use of such engines, moreover, are frequently changed by the purchaser of the engine or such engines resold with consequent change of service or conditions of use. The present invention enables the manufacturer to keep in stock steam-cylinders of a single pattern with a stock of slide-valve and piston-valve steam-chests and at once fill an order for engines with either a slide-valve or piston-valve, as required, by putting one or the other upon his single-pattern steam cylinder or cylinders; and the invention also enables a user to readily and at slight expense change his engine from a slide-valve to a piston-valve, or vice versa, in case a change in the service or conditions of use of his engine makes this desirable.

Under certain conditions of service also it is often necessary to provide what are known as "dash relief-valves" for the steam-cylinders of these pumps, which are usually located on each end of the steam-cylinder and are arranged to permit a certain portion of the cushioned steam to escape from the direct steam-port to the exhaust-cavity when the piston arrives at the end of its stroke, which enables the length of stroke to be graduated. The placing of such dash relief-valves on a pump of very small size is a difficult matter, as the space which they can be permitted to occupy is necessarily very limited. For this reason dash relief-valves are rarely put upon small pumps, although often their use would be beneficial. Whenever they are used, the length of the port is generally increased beyond what would be required for ordinary service. My invention includes the locating of the dash relief-valve in the casting carrying the main steam-valve, by which means the advantage of the dash relief is secured without enlargement of the cylinder-casting, and change of the steam-chest adds the dash relief-valves without any alteration whatever in the main cylinder and port castings.

The invention includes certain features relating to the interchangeable use of slide and piston-valve steam-chests on single or duplex steam-cylinders, an improved construction of piston valve steam-chest, and an improved lost-motion link for actuating steam-valves, all as fully described hereinafter and specifically pointed out in the claims.

For a full understanding of the invention a detailed description of a construction embodying all the features of the invention in their preferred form as applied to a direct-acting steam-pump of a well-known class will now be given in connection with the accompanying drawings, in which—

Figure 1 is a sectional elevation of the steam end of the pump with the piston-valve steam-chest, the cylinder and steam-chest being sectioned on line 1 of Fig. 2. Fig. 2 is a horizontal section on the line 2 of Fig. 1. Figs. 3 and 4 are cross-sections on, respectively, the lines 3 and 4 of Fig. 1. Fig. 5 is a section similar to Fig. 1, showing the slide-valve steam-chest in place with an ordinary D-valve. Fig. 6 is a cross-section on the line 6 of Fig. 5. Fig. 7 is a detail section of the lost-motion link shown in Fig. 1.

Referring now to the construction shown in Figs. 1 to 4 of the drawings, A A' are the steam-cylinders on the opposite sides of the engine; $a$, the pistons; $b$, the piston-rods; B, the piston-valve steam-chest. C is the inlet-pipe connection, shown as at the top of the valve-chest B, and D the exhaust-pipe connection, shown as of the common form and duplicated at the opposite sides of the cylinders, so that the exhaust-pipe E may be connected at either side. It will be understood, however, that the induction steam-pipe may connect with the steam-chest B in any other suitable manner and that any other suitable exhaust construction may be used. The piston-rods $b$ on each side of the engine are shown as actuating the valves on the opposite side of the engine through the usual cross-over valve-motion F, having the usual levers 10, actuated by the pistons, and crank-arms 11 on the opposite side of the engine connected to the valves. The steam-cylinders A A' have the usual induction-ports $d$ $d'$ and exhaust-ports $e$ $e'$ for the respective cylinders communicating, respectively, with the steam-chest on top of the cylinders and with the exhaust-cove $f$ by central exhaust-ports $g$, all these ports being shown as arranged for their control for admission and exhaust by slide-valves of the usual construction, the cylinders at the upper ends of these ports being constructed to provide a valve-seat for such slide-valves. The steam-cylinders are shown as cast integral with each other, so that a single casting forms the two steam-cylinders with their induction and exhaust ports, and upon the top of the cylinders is mounted the steam-chest B, which also is preferably cast integral for the two sides of the engine, as shown. This steam-chest B is formed so as to fit upon the top of the cylinder-casting and be secured thereon by the bolts 12, entering openings in the cylinder-casting, or detachably secured to the cylinder-casting in any other suitable manner, and this steam-chest is provided with ports $d^2$ $e^2$ $g^2$ and $d^3$ $e^3$ $g^3$, which respectively form extensions of the ports $d$ $e$ $g$ and $d'$ $e'$ $g'$ of the two steam-cylinders A A', the steam-cylinders and the exhaust-coves $f$ thus being connected with the piston-valve chambers $h$ $h'$, in which move the double piston-valves $i$ $i'$, which control the steam admission and exhaust ports in the usual manner, the steam entering the valve-chest from the induction-pipe through induction-port $k$, which opens through the top of the steam-chest casting and is continued longitudinally of the steam-chest by passage $l$, opening at opposite ends of the valve-chest into the steam-chambers $m$ at the end of the valve-chambers $h$ $h'$. The steam admission and exhaust ports $d^2 e^2 g^2$ and $d^3$ $e^3$ $g^3$ preferably extend about the piston-valves $i$ $i'$, as shown, and open to the pistons through the usual sleeves 13, in which the pistons work. The piston-valves are shown in the drawings as on center, and the piston-valve $i'$ is omitted in Fig. 2 for purpose of illustration. This construction may be used without dash relief-valves, or dash relief-valves may be used connecting the ports $d$ $e$ and $d'$ $e'$ in the cylinder-casting, as common in steam-engines. As above stated, however, dash relief-valves are preferably used and located in the steam-chest casting, and I have shown these dash relief-valves $r$ as controlling small passages connecting the ports $d^2$ $e^2$ and $d^3$ $e^3$ above the piston-valves $i$ $i'$ of the respective cylinders and having the stems $s$ $s'$ extending upward through the top of the steam-chest for manipulation. It will be understood, however, that these valves may be placed below the valves $i$ $i'$, if desired, with their stems projecting in any suitable manner. These valves $r$ may be of any common or suitable form and operate in the usual manner—that is, to permit the slow escape of the cushioning-steam from the cylinder through the induction-ports $d$ $d^2$ and the passage controlled by the dash relief-valves to the exhaust-passage $e^2$, and thus to the exhaust-cove $f$ after the piston $a$ has covered the opening of port $e$ to the cylinder A for cushioning, thus relieving slowly the dash or cushion in the cylinder at the end of each stroke. This dash-relief-valve construction is applicable to single as well as duplex engines. In this piston-valve steam-chest construction the lost-motion devices by which the proper lost motion is secured between the piston-rod on each side and the valve on the opposite side of the duplex engine shown are preferably placed outside the valve-chest, as illustrated, as this economizes space within the valve-chest, and thus aids in securing the compactness of construction which is one of the objects of the invention. In the construction shown the stems 14 of the piston-valves $i$ $i'$ preferably extend in both directions from the pistons and pass through stuffing-boxes 15, forming guides at the opposite ends of the steam-chest, in which the stems are packed in any suitable manner, and the stems 14 are connected by lost-motion links to the cranks 11 of the valve-movements. Any other suitable form of lost-motion connection may be used; but the lost-motion links $x$ shown are preferably used, and this lost-motion device forms in itself a specific feature of the invention. In this construction, which is shown in detail in Fig. 7, 1 is a sleeve screw-threaded on the outside from opposite ends and having the longitudinal slot 2. The sleeve is screw-threaded internally at one end to receive one end 3 of the link-rod, which is pivoted to the valve-stem 14, the other end 4 of the link-rod, which is pivoted to the crank-arm 11, moving freely in the sleeve 1 and carrying an actuating-collar 5, which moves upon the outside of the sleeve 1, being secured to the link end 4 by pin 6, moving in slot 2. This collar 5 when the lost motion has been taken up by the movement of the link end 4 in either direction with the crank-arm 11 engages one or the other of sleeves or nuts 7, so as to actuate the sleeve 1, and through the link end 3, attached thereto, actuate the valve-stem 14 and valve. These sleeves or nuts 7 are made adjustable on the sleeve 1, so that the amount of lost motion may be adjusted as desired, this adjustment being secured by screwing the sleeves or nuts 7 to the desired position upon the outside of sleeve 1 and then locking them in position by lock-nuts 8. This provides a very simple and efficient lost-motion connection.

The construction shown in Figs. 5 and 6 is the same as shown in Figs. 1 to 4, except that the piston-valve steam-chest B has been removed by withdrawing the bolts 12 and slide-valve steam-chest B' has been substituted therefor. This valve-chest B' is shown as of a common class having the end induction-pipe C', although it will be understood that this connection may be varied, and the ports $d\ e\ g$ and $d'\ e'\ g'$ are controlled by D-valves $n\ n'$, shown as of a common form and moving over the valve-seat formed on the cylinder-casting at the upper ends of the ports $d\ e\ g$ and $d'\ e'\ g'$. These D slide-valves $n\ n'$ are connected by the valve-rods 16, lost-motion links $x$, previously described, and thus to the crank-arms 11 of the valve-movements, or the lost motion may be provided for inside the valve-chest, as common with such slide-valve constructions, and a plain link be used for connecting the valve-rods 16 to the crank-arms 11. In either case it will be understood that the two valve-chests and their valves will be so constructed that one may be substituted for the other and the valve-rods 15 of the piston-valves or the valve-rods 16 of the slide-valves be in proper position for the operation by the valve-movement of either the piston-valves or slide-valves.

It will be understood that while the invention has been shown in connection with a duplex engine having small steam-cylinders cast together and integral valve-chests and certain features of the invention relate to such constructions other features of the invention are applicable also to larger steam-engines, either single cylinder or duplex, and are not limited to a single valve-chest in duplex-cylinder constructions. It will be understood also that modifications in the construction shown may be made by those skilled in the art without departing from the invention and that I am not to be limited to the exact form or arrangement of the parts shown in the drawings.

What I claim is—

1. A duplex piston-valve steam-chest adapted to be secured to a duplex-steam-cylinder construction in place of a duplex D or other slide-valve steam-chest and provided with separate admission and exhaust steam-ports controlled by the piston-valves and adapted to register with and form extensions of the cylinder steam-ports and having dash relief-valves controlling passages connecting the admission and exhaust ports.

2. The duplex piston-valve steam-chest B formed integral with the steam-ports $d^2$, $e^2$, $g^2$ and $d^3$, $e^3$, $g^3$ and adapted to be secured to a duplex-steam-cylinder construction with said ports registering with and forming extensions of the cylinder-ports, substantially as described.

3. The duplex piston-valve steam-chest B formed integral with the steam-ports $d^2$, $e^2$, $g^2$ and $d^3$, $e^3$, $g^3$ and passages containing dash relief-valves and adapted to be secured to a duplex-steam-cylinder construction with said ports registering with and forming extensions of the cylinder-ports, substantially as described.

4. A piston-valve steam-chest formed integral with separate admission and exhaust ports and passages connecting pairs of said ports and adapted to be secured to the steam-cylinder portion of a steam-engine with said ports registering with and forming extensions of the cylinder-ports, in combination with piston-valve mechanism in said casting controlling said admission and exhaust ports, and dash relief-valves controlling said passages, substantially as described.

5. A lost-motion link for valve-movements having a sleeve with one link end moving freely therein, an actuating member secured to said link end and extending outside said sleeve, and members on the outside of said sleeve in position to be engaged by the actuating member and adjustable on the sleeve to vary the amount of lost motion.

6. Lost-motion link $x$ having the sleeve 1 screw-threaded on the outside and provided with slot 2, collar 5 outside sleeve 1 and secured to link end 4 through the slot 2, and adjustable nuts 7 on sleeve 1 in position for engagement with collar 5, substantially as described.

7. A lost-motion link for valve-movements having a sleeve and link-rod moving freely longitudinally of each other but held from rotation, and actuating members connected to the valve-rod and adjustable to vary the amount of lost motion, substantially as described.

8. In a lost-motion connection for valve-movements, the combination with a member connected to the valve-rod, of a collar thereon movable longitudinally of the rod but held against rotation thereon, and actuating members connected to the valve-rod and engaged by the collar to move the valve in opposite directions, substantially as described.

9. The combination with a link-rod connected to the valve-rod, of a collar, as 2, having a non-rotatable sliding connection with said link-rod, means for reciprocating said collar by the valve-movement, and adjustable actuating members on opposite sides of the collar connected to the valve-rod and engaged by the collar to move the valve in opposite directions, substantially as described.

In testimony whereof I have hereunto set my hand in the presence of two subscribing witnesses.

CHARLES C. WORTHINGTON.

Witnesses:
  LOUIS R. ALBERGER,
  B. W. PIERSON.